No. 774,974. PATENTED NOV. 15, 1904.
E. S. BAKER & H. A. SCOTT.
SAFETY DEVICE FOR COUPLING ALTERNATORS.
APPLICATION FILED NOV. 12, 1903.
NO MODEL.
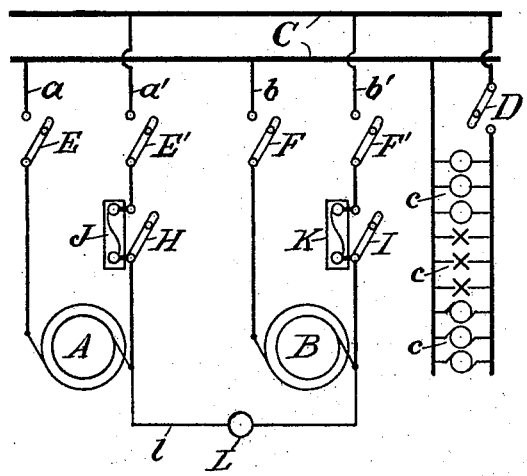
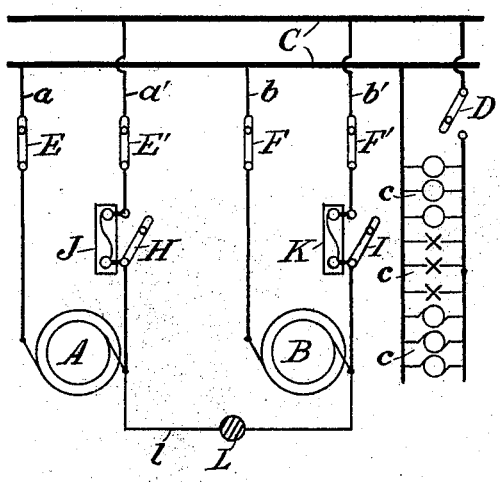
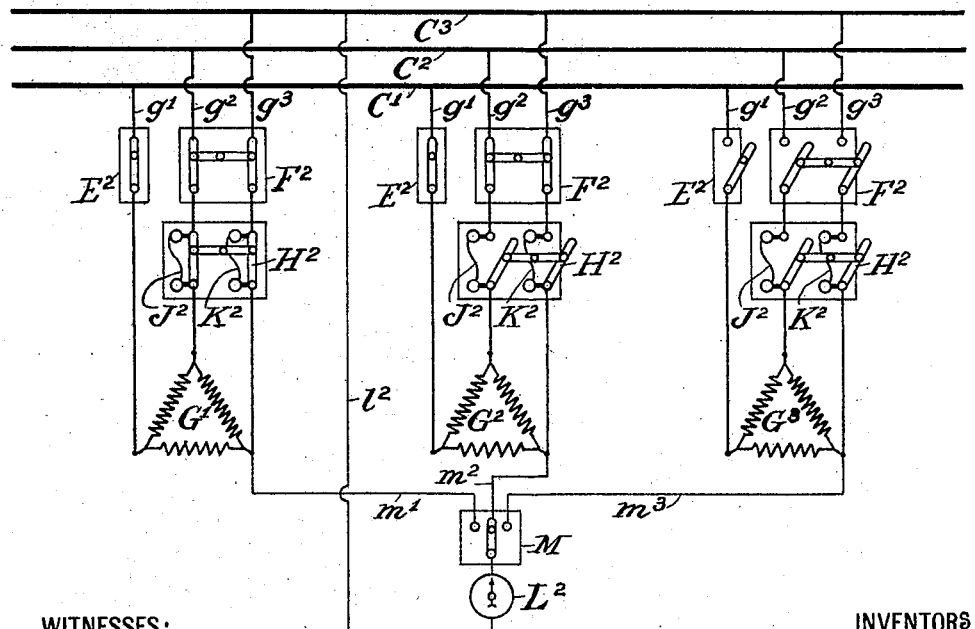
WITNESSES:
Anna R. McCole
William A. Kelly
INVENTORS
EDWIN STANTON BAKER
HERBERT ASHTON SCOTT
BY
Edward P. Thompson
ATTORNEY No. 774,974.

Patented November 15, 1904.

UNITED STATES PATENT OFFICE.

EDWIN STANTON BAKER AND HERBERT A. SCOTT, OF PIEDMONT, WEST VIRGINIA.

SAFETY DEVICE FOR COUPLING ALTERNATORS.

SPECIFICATION forming part of Letters Patent No. 774,974, dated November 15, 1904.

Application filed November 12, 1903. Serial No. 180,930. (No model.)

*To all whom it may concern:*

Be it known that we, EDWIN STANTON BAKER and HERBERT A. SCOTT, citizens of the United States of America, and residents of Piedmont, in the county of Mineral and State of West Virginia, have invented certain new and useful Improvements in Safety Devices for Coupling Alternators, of which the following is a specification.

Our invention relates to alternating-current electric generators; and it consists of a guard or safety device for preventing injury to a generator when thrown in parallel with another generator or with a line-circuit should the former not be in true synchronism with the latter at the moment of switching in.

It is well known among those skilled in the art that two alternators at the moment of coupling together should be "in step" with one another—that is to say the positive maxima and the negative maxima of current (or, more strictly speaking, of generated electromotive force) must occur at substantially the same instant. Should the opposite be the case—*i. e.*, should the positive electromotive-force maximum of one coincide with the negative maximum of the other—the result is equivalent to a short-circuit in that a momentary rush of current is produced which is sufficiently great to burn out the machines or auxiliary apparatus, or both, and this is likely to occur even where the machines are to a less degree out of phase with each other.

While various devices have been invented for indicating the proper moment of cutting in the generator, it is the object of our invention to guard against the possible ill effects of any errors made in this respect.

Generally speaking, our device comprises a circuit-breaking device or devices arranged in shunt with a special switch or switches independent of the main switch of the generator, but in circuit therewith, said circuit-breaking device or devices being arranged to open upon the passage of a current very much less than that of the normal load-current of the generator.

The nature of our invention is more explicitly set forth and will be best understood from the accompanying drawings in connection with the following description thereof.

In said drawings, Figure 1 represents our apparatus as arranged for single-phase alternators. Fig. 2 illustrates one method of operating the same to couple the machines in parallel. Fig. 3 represents a modified arrangement adapted to polyphase machines, illustrating also the method of operation of the same.

In Figs. 1 and 2, A and B are two monophase alternators, with connections $a$ $a'$ $b$ $b'$ to a line-circuit C, to which they are adapted to supply current and containing current-using devices $c$ $c$ $c$ and a cut-out switch D. In the connections $a$ $a'$ and $b$ $b'$ are placed the usual main switches E E' F F'; but the two poles E and E' and F and F' of each switch are independently operable, as indicated, instead of being yoked together, as ordinarily. Further, in each connection $a'$ $b'$ is located a special switch H I, which switches are shunted by automatic circuit-breaking devices J K, ordinarily simple fuses of such capacity as to carry only a small proportion of the full generator-load—as, for instance, for an eight-hundred-kilowatt generator whose normal load-current is about seven hundred amperes the fuse J or K should not carry in excess of fifty amperes. These switches and fuses may be located at any point in the connections $a'$ $b'$ or $a$ $b$; but we prefer to place them between the generator-poles and the switches E' F'. For the purpose of bringing the machines into phase their corresponding poles may be joined by a lead $l$, in which is located any suitable synchronizing device L—for example, an incandescent lamp or groups of lamps, which show by light or darkness the phase relation of the two generators; but such device forms no part of our invention, and any suitable synchronizer may be used, this being the usual adjunct of every such installation and shown here only by way of illustration of our mode of operation.

The mode of operation may be as follows: Either the two generators A B may be simultaneously brought up to proper speed and voltage and thrown into circuit or, assuming one generator to be already in operation, the other may be brought up to speed, voltage, and synchronism and then thrown in parallel with it. In Fig. 2 the former procedure is illustrated. The line-switch D being open and the two generators being brought to the same speed, their field-currents are adjusted until they show the same line-pressure. The switches E F are now cut in. The synchronizer L will now indicate when the machines are in phase—as, for instance, if L be a lamp by darkness—as indicated by the shading in Fig. 2. At this moment the switches E' and F' should be cut in either simultaneously or successively, and if the machines be still in phase the small current-well below the fusing capacity of J or K will suffice to hold them so, (supposing the line C to be open.) If, however, at the moment of closing the last switch F' the generators are no longer in phase, there will be a rush of current which will melt the fuses J K, and thus prevent damage to the machines or appliances. Supposing the fuses J K to hold, the switches H and I are closed, relieving the fuses, and the line-switch D may now be closed and the generator-fields adjusted until the load is equally divided.

In Fig. 3 is illustrated our device applied to a three-phase circuit and also the second mode of operation above referred to. Three generators $G' G^2 G^3$ are shown connected to the three-phase bus-bars $C' C^2 C^3$ by the leads $g' g^2 g^3$, respectively. In each lead $g'$ is located a single-pole switch $E^2$, and in each pair of leads $g^2 g^3$ are located double-pole switches $F^2$ and $H^2$, the latter preferably located next the generators. Each switch $H^2$ is shunted by fuses $J^2 K^2$ or equivalent circuit-breaking devices, said fuses being of relatively low capacity, as described above, for the fuses J K. A synchronizer $L^2$ is permanently connected with one of the bus-bars $C^3$ and connected alternately with the corresponding pole of either of the generators $G' G^2 G^3$ by leads $m' m^2 m^3$ and a multiple switch M.

In the drawings the left-hand generator $G'$ is represented as in service on the line, the right-hand generator $G^3$ as out of service, and the central generator $G^2$ as in process of being thrown in. This latter is carried out as follows: The generator is first brought to proper speed and to line-pressure by regulating the field-current. The main switch $E^2$ of this generator is now closed and the switch M moved to synchronize $G^2$ with the line. When the synchronizer $L^2$ indicates that $G^2$ is in step, switch $F^2$ is closed and subsequently (if the fuses $J^2 K^2$ hold) the switch $H^2$. Then the voltage of the generator $G^2$ is raised until it takes its share of the load. If the closing of the switch $F^2$ should be incorrectly timed, the fuses $J^2$ and $K^2$ will blow, as previously explained, and the switch $F^2$ must be opened again, the fuses replaced, and operation performed over again.

It will be observed that our safety device is extremely simple and can be placed on any switchboard with very little expense or trouble and will infallibly protect valuable machinery against the mistakes or carelessness of operators.

Our device is adaptable to any class or number of phases of alternating-current machinery, and we of course realize that it is susceptible of various modifications in the arrangement or connections and do not, therefore, confine ourselves to the precise arrangement shown.

Having thus described our invention, what we claim, and desire to secure by Letters Patent, is—

1. The combination of two alternating-current generators, brought up to the proper voltage and synchronism, main-line conductors, a phase-indicator connected up with said generators, and safety devices in circuit with the generators and for preventing injury to either generator when they are included in parallel circuit with each other on the main-line conductors.

2. In combination, an alternating-current circuit, a generator, a main switch arranged to connect the generator and circuit, a secondary switch between the generator and circuit and in series with said main switch, a circuit-breaking device independent from said main switch and permanently shunting said secondary switch, and a synchronism-indicator between said generator and circuit.

3. In combination, an alternating-current circuit, a generator, a switch arranged to connect one pole of said generator with one pole of said circuit, a second switch arranged to connect the other pole or poles of said generator with the corresponding pole or poles of said circuit, an auxiliary switch in series with said second switch, and circuit-breaking devices of relatively low carrying capacity shunting said auxiliary switch.

4. In combination, an alternating-current circuit, a generator, a switch arranged to connect one pole of said generator with one pole of said circuit, a second switch arranged to connect the other pole or poles of said generator with the corresponding pole or poles of said circuit, an auxiliary switch in series with said second switch, and a low-capacity fuse shunting each pole of said auxiliary switch.

5. In combination, an alternating-current circuit, a generator, a switch arranged to connect one pole of said generator with one pole of said circuit, a second switch arranged to connect the other pole or poles of said generator with the corresponding pole or poles of said circuit, an auxiliary switch in series with said second switch, circuit-breaking devices of relatively low carrying capacity shunting said auxiliary switch, and a synchronism-indicator arranged to indicate the phase relation of said generator and circuit.

6. In combination, an alternating-current circuit, a generator, a switch arranged to connect one pole of said generator with one pole of said circuit, a second switch arranged to connect the other pole or poles of said generator with the corresponding pole or poles of said circuit, an auxiliary switch in series with said second switch and between the latter and the generator, and circuit-breaking devices of relatively low carrying capacity shunting said auxiliary switch.

7. The combination of two alternating-current generators, brought up to the proper voltage and synchronism, main-line conductors, a phase-indicator connected up with said generators, and safety devices in circuit with the generators and for preventing injury to either generator when they are included in parallel circuit with each other on the main-line conductors, said devices consisting of two independent switches in series with the respective generators, and automatic cut-outs in shunt-circuits to one of the said respective switches of said generators.

8. The combination of two alternating-current generators, brought up to the proper voltage and synchronism, main-line conductors, a phase-indicator connected up with said generators and safety devices, in circuit with the generators and for preventing injury to either generator when they are included in parallel circuit with each other on the main-line conductors, said devices consisting of two independent switches in series with the respective generators, an automatic cut-out in shunt-circuits to one of the said respective switches of said generators, and in series with the other respective switches of said generators.

In testimony whereof we have hereunto subscribed our names and affixed our seals this 10th day of November, 1903.

E. STANTON BAKER. [L. S.]
  HERBERT A. SCOTT. [L. S.]

Witnesses:
  J. D. THOMAS,
  A. G. HENNING.